(12) United States Patent
Siriwardane et al.

(10) Patent No.: US 10,106,407 B1
(45) Date of Patent: Oct. 23, 2018

(54) METAL FERRITE OXYGEN CARRIERS/CATALYST FOR PARTIAL OXIDATION OF METHANE FOR PRODUCTION OF SYNTHESIS GAS

(71) Applicant: Energy, United States Department of, Washington, DC (US)

(72) Inventors: Ranjani V. Siriwardane, Morgantown, WV (US); Yueying Fan, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/497,708

(22) Filed: Apr. 26, 2017

(51) Int. Cl.
| | | |
|---|---|---|
| *C01B 3/40* | (2006.01) | |
| *B01J 23/78* | (2006.01) | |
| *B01J 23/94* | (2006.01) | |
| *B01J 38/12* | (2006.01) | |

(52) U.S. Cl.
CPC ............ *C01B 3/40* (2013.01); *B01J 23/78* (2013.01); *B01J 23/94* (2013.01); *B01J 38/12* (2013.01); *C01B 2203/0261* (2013.01); *C01B 2203/1047* (2013.01); *C01B 2203/1241* (2013.01) F23C 2900/99008; F23C 13/08; F23C 10/01; C01B 13/0203; F23B 7/00
See application file for complete search history.

(58) Field of Classification Search
CPC ......... Y02E 20/346; B01J 21/20; B01J 23/00; B01J 23/002; F23C 99/00; F23C 10/04;
(Continued)

(56) References Cited

U.S. PATENT DOCUMENTS

| | | | |
|---|---|---|---|
| 8,397,508 B2 * | 3/2013 | Weimer | C01B 3/042 423/418.2 |
| 2008/0164443 A1 * | 7/2008 | White | B01J 23/002 252/373 |

* cited by examiner

*Primary Examiner* — Amber R Orlando
*Assistant Examiner* — Syed T Iqbal
(74) *Attorney, Agent, or Firm* — Timothy L. Harney; Daniel D. Park; Brian J. Lally

(57) ABSTRACT

Materials, methods to prepare, and methods of use for partial oxidation of methane. Embodiments include delivering a metal ferrite oxygen carrier to a fuel reactor, wherein the metal ferrite oxygen carrier comprises MFexOy where $1 \leq x \leq 3$ and $3 \leq y \leq 5$, and where M comprise a Group II alkali earth metals; and delivering a gaseous stream that contains methane to the metal ferrite oxygen carrier in the fuel reactor and maintaining the fuel reactor at a reducing temperature sufficient to reduce some portion of the metal ferrite oxygen carrier and oxidize some portion of the methane containing gas stream. Embodiments further include generating gaseous products containing $H_2$ and CO gas in the fuel reactor; withdrawing a product stream from the fuel reactor, where the gaseous products comprise the product stream, and where at least >50 vol. % of the product stream includes CO and $H_2$; oxidizing the reduced carrier in an oxidizing reactor by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the M component, and some portion of the FecOd component, and further wherein the product of the oxidizing reaction is a re-oxidized carrier that comprises some portion of the MFexOy; and delivering heat generated in the oxidizing reactor to the fuel reactor for the reaction of metal ferrite with methane.

17 Claims, 7 Drawing Sheets

METAL FERRITE OXYGEN CARRIERS/CATALYST FOR PARTIAL OXIDATION OF METHANE FOR PRODUCTION OF SYNTHESIS GAS

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

FIELD OF THE INVENTION

One or more embodiments consistent with the present disclosure relate to producing a synthesis gas stream free of nitrogen from natural gas. More specifically, one or more embodiments relate to development of novel group II metal ferrites such as Mg, Ca, Ba and Sr ferrites, for conversion of methane to synthesis gas. The group II metal ferrites can be used in a chemical looping process to produce synthesis gas from methane and oxidation of reduced metal ferrite with air. In another embodiment, the group II metal ferrite are used a catalyst for continuous production of synthesis gas from methane with an oxygen steam produced by chemical looping oxygen un-coupling

BACKGROUND

Natural gas, which is composed primarily of methane, is a low-cost C-containing feedstock and one of the most abundant fuels in U.S. Large quantities of natural gas are flared in refineries, chemical plants, oil wells and landfills releasing greenhouse gases $CO_2$ and unburned $CH_4$. It is important to find an efficient and clean processes to use the natural gas reserves. Direct conversion of methane to useful chemicals or fuels is difficult and requires multi-step processes at high temperatures. The economically available route to producing valuable chemicals from methane is via synthesis gas followed by different chemical routes to manufacture the desired chemicals. In a large scale industrial plant, the production of syngas accounts for a large part of the total costs. Therefore, it is very important to develop more efficient and cost effective methods for the conversion of methane to syngas. The commercial process for natural gas conversion to synthesis gas is the steam methane reforming (SMR) process which is an endothermic reaction as shown in reaction [1].

$$CH_4 + H_2O \rightarrow CO + 3H_2 \quad Hr = +206 \text{ kJ/mol} \quad [1]$$

SMR reaction is conducted in large tubular reactors to achieve high temperatures needed to obtain high yields which contributes to very high energy consumption. After the SMR reaction, water gas shift (reaction [2]) reaction is performed to remove CO and increase the $H_2/CO$ ratio:

$$CO + H_2O \rightarrow CO_2 + H_2 \quad Hr = -41 \text{ kJ/mol} \quad [2]$$

Partial oxidation of methane (POM) is a one step process to form $H_2$ and CO at a ratio of 2 (Eq. 3) from methane:

$$CH_4 + O_2 \rightarrow CO + 2H_2 \quad Hr = -36 \text{ kJ/mol} \quad [3]$$

Unlike steam reforming, partial oxidation reaction may be conducted auto thermally because of the mild exothermicity of the reaction. Another big advantage is that the $H_2/CO$ ratio of 2 is ideal for most downstream processes, making partial oxidation of methane a simple, one-step process.

In the catalytic partial oxidation of methane (CPOM) reaction, catalysts such as noble metal (Pt, Rh, Ir, Pd) and non-noble metal (Ni, CO) have been used to convert methane with oxygen (or air) to syngas in a single step process (See Saleh A. Al-Sayari, Recent Developments in the Partial Oxidation of Methane to Syngas, The Open Catalysis Journal, 2013, 6, 17-28). High reaction rates due to very high auto thermal temperatures exceeding 1000° C. have been obtained with the CPOM Reaction 3. The contact times necessary for CPOM is several orders of magnitude shorter than steam reforming. All these advantages make CPOM a promising and better technology than steam reforming to convert natural gas to syngas. Noble metals such as Pd, Ir, Ru and Pt have been reported as catalysts in the CPOM reaction but they are very expensive. Ni-based catalysts, which are less expensive, have been used but the reactivity is less than that with noble metals. In addition, Ni suffers from deactivation during on-stream due to sintering, carbon deposition, solid state reactions and volatilization as metal carbonyls. Another disadvantage with Ni is that it is a suspected carcinogen and additional costs are needed for safe handling of the materials.

In the CPOM process shown in reaction [3], oxygen is provided by air and that requires an air separation unit to provide pure oxygen making the process very expensive. If air is used in the process the synthesis gas will be diluted by $N_2$. In addition, there are safety issues in mixing air with methane in the CPOM process.

To overcome these difficulties associated with CPOM, chemical looping (CL) partial oxidation of methane (see M. Ryden, A. Lyngfelt, t. Matteson, Chemical looping combustion and reforming in a circulating fluid bed using Ni-based oxygen carriers, Energy and Fuels 2008, 22, 2585-97) has been considered. In CL partial oxidation of methane, an oxygen from an oxygen carrier such as metal oxide is used for partial oxidation and reduced oxygen carrier is oxidized with air in a separate reactor so there is no mixing of fuel with air. The major barrier for the CL partial oxidation of methane is the development of a suitable oxygen carrier that performs the selective oxidation of methane to produce syngas without combusting methane. One of the more important criteria is that syngas produced should not further react with the oxygen carrier. It is very critical to select a suitable oxygen carrier for this process.

Various oxygen carriers have been tested in the past but reactivities have been reported to be low. Ni, Fe, La, ceria, perovskites (See U.S. Pat. No. 6,143,203 to Zeng et al, and US Patent Application No. 2008/0164443 to White et al) based materials have shown the best performance. Ni based materials have environmentally issues while Ceria and La based materials are expensive.

In one or more embodiments of the current invention, the use of Group II ferrites such as Ba, Ca, Mg and Sr ferrites as oxygen carriers for chemical looping methane partial oxidation process are described which showed very promising performance. The disclosed calcium, magnesium and barium ferrites do not have any environmental safety issues and can be easily prepared using readily available materials contributing to a low cost.

In addition, in one or more embodiments a process to supply an oxygen stream by metal oxide (e.g. CuO) decomposition (chemical looping oxygen un-coupling or CLOU) is also described. In this process, metal ferrites perform as catalysts for the CPOM process with a continuous oxygen stream from CLOU to continuously convert methane to syngas. The advantage of this process is that it does not require an air separation unit to separate air.

These and other objects, aspects, and advantages of the present invention will become better understood with reference to the accompanying description and claims.

SUMMARY

This disclosure provides materials, methods to prepare, and methods of use partial oxidation of methane. Embodiments include delivering a metal ferrite oxygen carrier to a fuel reactor, wherein the metal ferrite oxygen carrier comprises $MFe_xO_y$ where $1 \leq x \leq 3$ and $3 \leq y \leq 5$, and where M comprise Group II alkali earth metals; and delivering a gaseous stream that contains methane to the metal ferrite oxygen carrier in the fuel reactor and maintaining the fuel reactor at a reducing temperature sufficient to reduce some portion of the metal ferrite oxygen carrier and oxidize some portion of the methane containing gas stream. Embodiments further include generating gaseous products containing $H_2$ and CO gas in the fuel reactor; withdrawing a product stream from the fuel reactor, where the gaseous products comprise the product stream, and where at least >50 vol. % of the product stream includes CO and $H_2$; oxidizing the reduced carrier in an oxidizing reactor by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the M component, and some portion of the $FeO_d$ component, and further wherein the product of the oxidizing reaction is a re-oxidized carrier that comprises some portion of the $MFe_xO_y$; and delivering heat generated in the oxidizing reactor to the fuel reactor for the reaction of metal ferrite with methane.

Embodiments include the Group II alkali earth metals comprises one of Mg, Ca, Ba, Sr and combinations thereof; the reducing temperature ranges from about 700° C. to about 1100° C.; wherein $1.5 \leq x \leq 2.5$ and $3.5 \leq y \leq 4$.

Still one or more embodiments include the $MFe_xO_y$ comprises at least 30 wt. % of the metal ferrite oxygen carrier; the metal ferrite oxygen carrier further comprises an inert support that comprises from about 5 wt. % to about 60 wt. % of the metal ferrite oxygen carrier; the inert support contains at least one of alumina, silica, zirconia, clay, titania, monolith and a combination thereof.

Yet other embodiments include methane concentration greater than 5 vol. %.

Embodiments include generating a reduced carrier by mixing the methane containing gas stream and the metal ferrite oxygen carrier in the fuel reactor, where the reduced carrier comprises an M component and an $FeO_d$ component, where the M component comprises some portion of the M comprising the $MFe_xO_y$, and MO and where the $FeO_d$ component comprises some portion of the Fe comprising the $MFe_xO_y$, where $c>0$ and $d \geq 0$. The $FeO_d$ component may include $Fe^0$, FeO, $Fe_3O_4$ or $Fe_2O_3$ and M component is MO or $MCO_3$ or $MFe_{x-n}O_{y-m}$ where $n<x$ and $m<y$. Oxidization of the reduced carrier occurs in the oxidizing reactor further includes transferring the reduced carrier from the fuel reactor to the oxidizing reactor; supplying the oxidizing gas to the oxidizing reactor, generating a re-oxidized carrier; transferring the re-oxidized carrier from the oxidizing reactor to the fuel reactor; repeating the delivery of the metal ferrite oxygen carrier to the fuel reactor, introducing methane to the metal ferrite oxygen carrier in the fuel reactor; and withdrawing the product stream from the fuel reactor. The embodiments may include oxidizing temperature ranges from about 700° C. to about 1100° C.

Still another embodiment relates to producing synthesis gas from methane. The embodiment includes delivering a metal ferrite oxygen carrier to a catalytic reactor, where the metal ferrite oxygen carrier comprises $MFe_xO_y$ where $1 \leq x \leq 3$ and $3 \leq y \leq 5$, and where M is one of Mg, Ca, Ba, Sr and combinations thereof; and where the $MFe_xO_y$ comprises at least 30 wt. % of the metal ferrite oxygen carrier; delivering a continuous gas stream containing methane of at least >5 vol. %; delivering a continuous gas stream containing oxygen >1 vol. %; maintaining the catalytic reactor at a reaction temperature sufficient to reduce some portion of the metal ferrite oxygen carrier and oxidize some portion of the methane containing gas stream; generating a continuous stream of gaseous products containing $H_2$ and CO gas in the catalytic reactor; and withdrawing a product stream from the fuel reactor, where the gaseous products comprise the product stream where at least >50 vol. % of the product stream consists of CO and $H_2$. The oxygen gas stream may be provided by oxygen separated from air.

Embodiments may include decomposing metal oxide or peroxide generating a gaseous oxygen stream by maintaining a temperature sufficient to generate oxygen from the metal oxide/peroxide by decomposition reaction or Chemical looping un-coupling (CLOU) reaction in the CLOU reactor; transferring the reduced metal oxide/peroxide to the oxidizing reactor; oxidizing the reduced metal oxide/peroxide by contacting an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the reduced metal oxide/metal peroxide, and where the product of the oxidizing reaction is a re-oxidized metal oxide/peroxide; and delivering heat generated from the oxidizing reactor to the CLOU reactor.

Embodiments may include the metal oxide and peroxides contain at least one of copper oxide, manganese oxide, peroxides of alkali, Ba or Sr or combination of thereof; the decomposition temperature needed to generate oxygen in the CLOU reactor is above 300° C.; and the oxidation temperature in the oxidizing reactor is above 300° C.

BRIEF DESCRIPTION OF THE DRAWINGS

These and other features, aspects, and advantages of the multiple embodiments of the present invention will become better understood with reference to the following description, appended claims, and accompanied drawings where:

DESCRIPTION OF THE EMBODIMENTS

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of inorganic materials, methods of their preparation, and methods for using such materials. One or more embodiments consistent with the present invention relate to producing a synthesis gas stream free of nitrogen from partial oxidation of methane using group II ferrites. The metal ferrite comprises MFexOy, where MFexOy is a chemical composition and M is one of Ca, Ba, Mg, Sr and combinations thereof, and where $1<x<3$ and $3<y<5$. More specifically, one or more embodiments relate to using group II metal ferrites as an oxygen carrier in chemical looping partial oxidation. Another embodiment relates to a catalytic process using group II ferrites combined with a gaseous oxygen stream produced from chemical looping un-coupling producing a continuous stream of synthesis gas stream free of nitrogen from methane.

Group II metal ferrites such as barium and calcium ferrites have unique properties. They react with methane to produce CO and $H_2$ unlike transition metal ferrites such as copper or nickel ferrites which react with methane to produce combustion products, $CO_2$ and $H_2O$. The group II metal ferrites also do not react with the CO and $H_2$ which makes it easier to control the reaction at the partial oxidation stage with methane to produce syngas.

Embodiments provide a metal ferrite oxygen carrier having improved durability and reactivity over metal oxides currently used in the partial oxidation of methane. The metal ferrite oxygen carrier comprises MFexOy with $1<x<3$ and $3<y<5$ where M is one of Ca, Ba, Mg, Sr and combinations thereof. In another embodiment, the metal ferrite oxygen carrier comprises MFe2O4. In particular embodiments, the MFexOy comprises at least 30 wt. % of the metal ferrite oxygen carrier. In certain embodiments, the metal ferrite oxygen carrier further comprises an inert support. The inert support material does not participate in the oxidation and reduction reactions of the MFexOy comprising the metal ferrite oxygen carrier. In an embodiment, the inert support comprises from about 5 wt. % to about 60 wt. % of the metal ferrite oxygen carrier and the MFexOy comprises at least 30 wt. % of the metal ferrite oxygen carrier. Partial gasification of methane with the metal ferrite oxygen carrier generates a product stream of syngas comprising at least 50 vol. % of the product stream.

Figure 1:
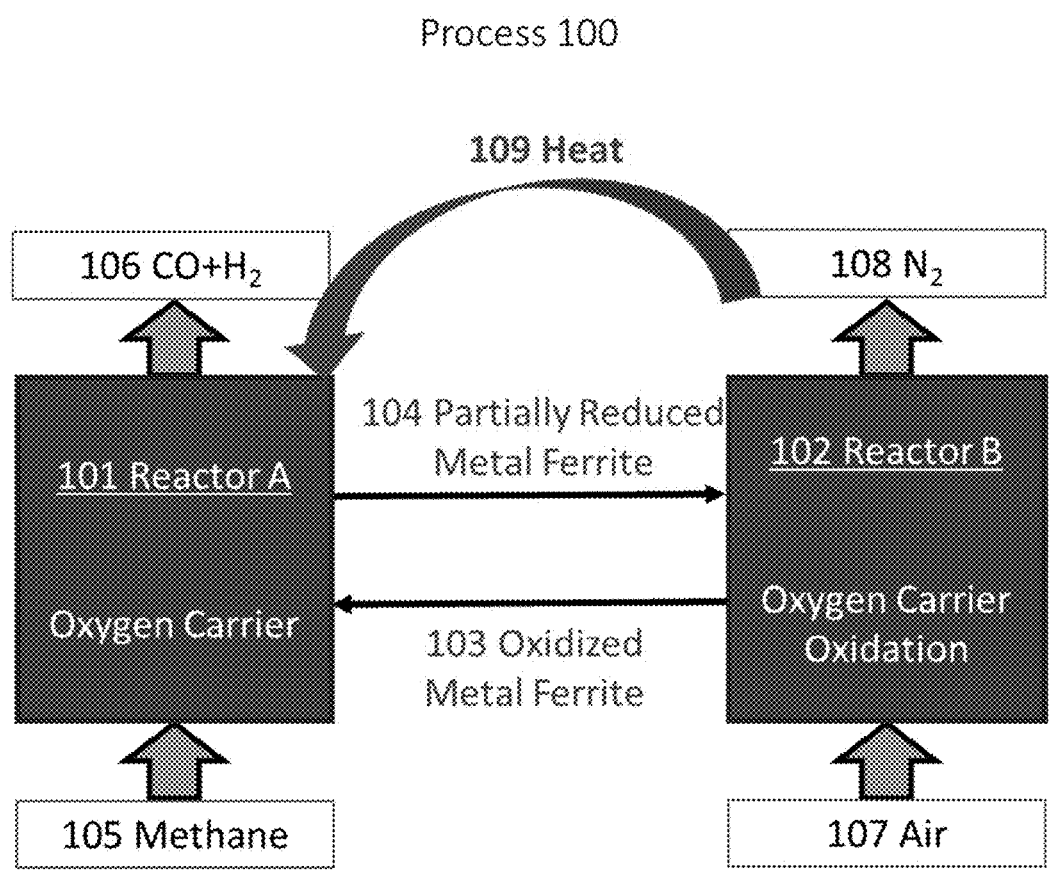
FIG. 1 depicts the cyclic process of chemical looping partial oxidation of methane to produce syngas with group II metal ferrites as the oxygen source and oxidation of reduced metal ferrite with air.

A system 100 within which the group II metal ferrite oxygen carrier disclosed herein may be utilized as illustrated in FIG. 1. FIG. 1 illustrates a chemical looping partial oxidation of methane system includes fuel reactor 101. Metal ferrite oxygen carrier 103 is placed in the fuel reactor 101. Methane 105 is introduced to the fuel reactor 101 for the partial oxidation reaction with metal ferrite oxygen carrier 103. Fuel reactor 101 is at a reducing temperature sufficient to reduce at least a portion of the metal ferrite oxygen carrier 103. In an embodiment, the reducing temperature ranges from about 700° C. to about 1100° C. The reaction involved in the fuel reactor 101 between metal ferrites 103 and methane 105 is shown in reaction [4].

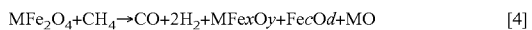

$$MFe_2O_4+CH_4 \rightarrow CO+2H_2+MFexOy+FecOd+MO \qquad [4]$$

Within fuel reactor 101, metal ferrite oxygen carrier interacts with methane 105, and the MFexOy comprising the metal ferrite oxygen carrier reduces to a reduced carrier comprising one or more M components and a FecOd component. The M components comprise some portion of the M comprising MFexOy and MO. The FecOd component comprises some portion of the Fe comprising the MFexOy, with $c>0$ and $d≥0$. For example, the FecOd component may be Fe or may be an iron oxide such as FeO, $Fe^0$, and $Fe_3O_4$, among others. In an embodiment, the FecOd component is FeOt, where $0≤t≤1.5$. For example, in an embodiment where the metal ferrite oxygen carrier is $CaFe_2O_4$ on the inert support, the $CaFe_2O_4$ interacts with methane 105 reactor 101 and generates a reduced carrier comprising CaO, Fe, $Fe_3O_4$, and $Ca_2Fe_2O_5$. In this embodiment, the M components CaO and $Ca_2Fe_2O_5$ generated by the reduction comprises some portion of the Ca comprising the $CaFe_2O_4$, and Fe and $Fe_3O_4$ comprise the FecOd component FeOt where $0≤0≤1.5$. In an embodiment, the M components comprise some portion of the M comprising the MFexOy and have an absence of the Fe comprising the MFexOy, such as for example CaO.

The reducing temperature is sufficient to reduce some portion of the MFexOy oxygen carrier and oxidize some portion of methane, generating syngas products 106 in the fuel reactor 101. The syngas products 106 are withdrawn from fuel reactor 101 as a product stream at exhaust, and the reduced carrier 104 may exit the fuel reactor. At the exhaust, at least 50 vol. % of the product stream comprises CO and $H_2$. In an embodiment, at least 90 vol. % of the product stream comprises CO and $H_2$.

The reduced carrier 104 exiting the fuel reactor 101 may subsequently enter oxidation reactor 102. Oxidation reactor 102 further receives a flow of oxidizing gas such as air 107, and facilitates contact between the reduced carrier 104 and the oxidizing gas, generating a re-oxidized carrier 103 as shown in reaction [5].

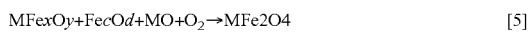

$$MFexOy+FecOd+MO+O_2 \rightarrow MFe2O4 \qquad [5]$$

The product of the oxidizing reaction is the re-oxidized carrier 103, where in at least one embodiment the re-oxidized carrier comprises MFeaOb on the inert support. Generally, the MFeaOb comprising the re-oxidized carrier 103 is substantially equivalent to the MFexOy comprising the metal ferrite oxygen carrier. For example, when the metal ferrite oxygen carrier comprises $CaFe_2O_4$ on the inert support and the reduced carrier 104 comprises CaO, $CaFe_2O_5$, Fe, and FeO, then the oxidation reaction generates a re-oxidized carrier 103 comprising $CaFe_2O_4$ on the inert support. Oxidation reactor 102 is at an oxidation temperature sufficient to oxidize at least a portion of the reduced carrier. In an embodiment, the oxidizing temperature ranges from about 700° C. to about 1100° C.

As used herein, to "reduce some portion of the metal ferrite oxygen carrier" refers to the loss of oxygen from the MFexOy comprising the metal ferrite oxygen carrier. For example, the reduction of a MFexOy composition to FeO, $Fe_3O_4$, and/or Fe and an M component, where the M component comprises some portion of the M comprising MFexOy, or alternatively, the reduction of a MFexOy composition to a MFeaOb composition, where a/b>x/y. Additionally, the phrase to "oxidize some portion of the methane" refers to the gain of oxygen by methane and the generation of gaseous products comprising CO and $H_2$. Similarly, the terms "oxidizing" or "oxidation" as it applies to a reduced carrier comprising the M components and the FecOd component means a reaction with oxygen among the M components and the FecOd component, where the oxidation reaction produces the MFexOy. The phrase "reducing temperature" refers to a temperature sufficient to generate reduction and the phrase "oxidizing temperature" refers to a temperature sufficient to generate oxidation under other existing conditions.

The oxidizing reaction occurring in oxidation reactor 102 and oxygen containing gas stream such as air 107 is an exothermic reaction, and heat generated 109 is carried from oxidizing reactor 102 to reactor 101. The gaseous flow exiting at 108 from the oxidizing reactor 102 is comprised of the oxidizing gas less that oxygen utilized for the generation of the re-oxidized carrier. For example, when the flow of oxidizing gas is air, the gaseous flow exiting at 108 is comprised of $N_2$ and possibly some remaining $O_2$, and other components. Heat 109 from the oxidizer may also be transferred to the fuel reactor 101 to provide heat for the syngas production by the reaction [4]. The re-oxidized carrier may be subsequently transported to fuel reactor 101 for use as the metal ferrite oxygen carrier in a cyclic operation.

It is understood that FIG. 1 provides an exemplary application illustrating partial oxidation of methane, and the like, however the specifics of the process illustrated are not intended to be limiting. Within this disclosure, it is important that a metal ferrite oxygen carrier be delivered to a fuel reactor, where the metal ferrite oxygen carrier comprises $MFe_xO_y$, where $1 \leq x \leq 3$ and $3 \leq y \leq 5$, and where M is one of Ca, Ba, Mg, Sr and combinations thereof, and that the metal ferrite oxygen carrier contact methane containing gas stream at a reducing temperature sufficient to reduce some portion of the metal ferrite oxygen carrier and oxidize some portion of methane to generate a product stream comprising at least 50 vol. % CO and $H_2$. In an embodiment, $MFe_xO_y$ is one of $CaFe_2O_4$, $BaFe_2O_4$, and combinations thereof. The inert support when present does not participate in the oxidation and reduction reactions of the $MFe_xO_y$. In an embodiment, the inert support is alumina ($Al_2O_3$).

Figure 2:
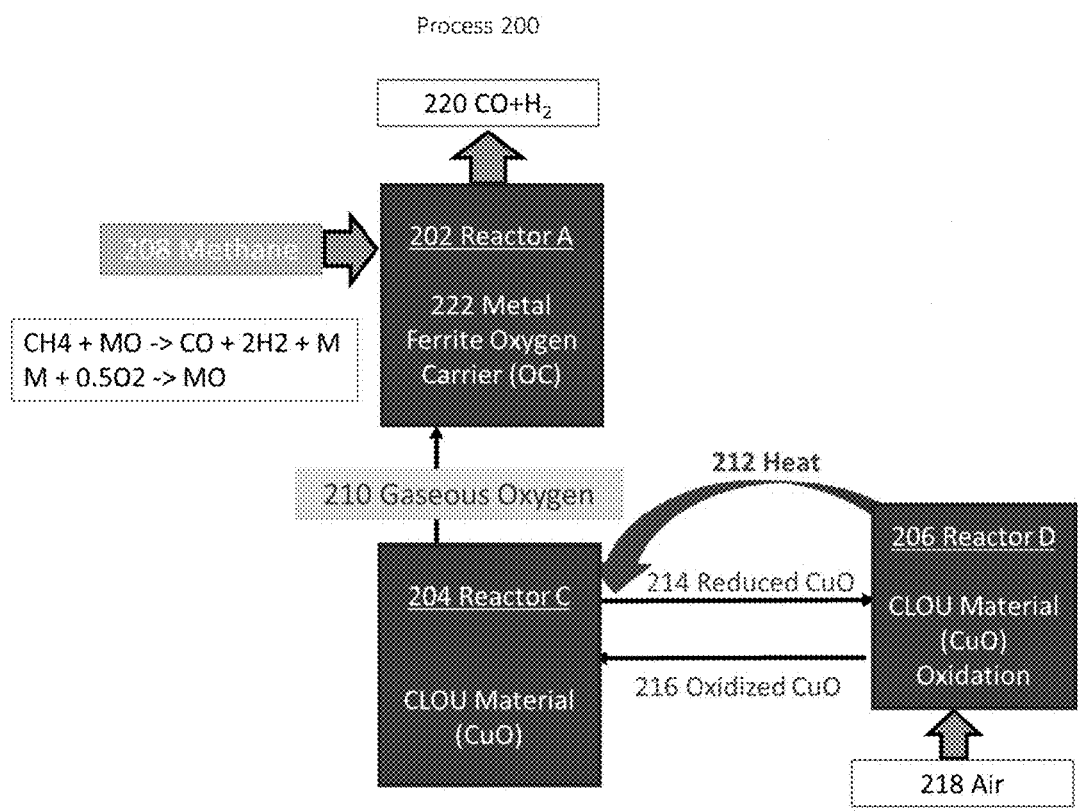
FIG. 2 depicts the process of continuous catalytic partial oxidation of methane using group II metal ferrite as the catalyst with a continuous gaseous oxygen stream from chemical looping oxygen uncoupling (CLOU) materials.

Another embodiment includes system 200 within which the group II metal ferrite oxygen carrier disclosed here may be utilized is illustrated in FIG. 2. In this process, group II metal ferrites perform as catalysts and a continuous flow of methane 208 and gaseous oxygen 210 are introduced to the metal ferrite 222 placed in the catalytic reactor 202 to produce syngas 220. Catalytic reactor 202 is at a temperature sufficient to convert methane 208 and oxygen 210 to syngas 220 in the presence of the metal ferrite oxygen carrier 222 as shown in reaction [3]. In an embodiment, the reaction temperature range is from about 700° C. to about 1100° C.

Gaseous oxygen stream 210 may be from oxygen separated from air. In this process illustrated in FIG. 2, CLOU material such as CuO 216 placed in the CLOU reactor 204 is used for production of the gaseous oxygen stream 210. CLOU materials such as CuO 216 produce gaseous oxygen stream by thermal decomposition as shown in reaction [6].

$$2CuO \rightarrow Cu_2O + O_2 \quad [6]$$

Reduced copper oxide 214 after the thermal decomposition reaction in the CLOU reactor 204 is transferred to oxidation reactor 206 for oxidation. Air 218 is introduced to the oxidation reactor 206 to oxidize the reduced CuO 214. After oxidation, the oxidized CuO 216 from the reactor 206 is transferred to reactor 204. The oxidation reaction in reactor 206 is exothermic and the heat 212 produced is transferred to reactor 204 for CuO 216 decomposition to produce gaseous oxygen 210. CLOU materials may be selected from CuO, manganese oxides, barium peroxides, strontium peroxide, alkali metal peroxides such as sodium peroxide. The temperatures of the CLOU reactor 204 and oxidation reactor 206 are above 300° C. As used herein the CLOU materials may consist of materials that can absorb oxygen from air at a certain temperature and pressure and release oxygen at a certain temperature and pressure. More specifically, the materials may include CuO, Mn-oxide, peroxides of alkali metals, Ba and Sr.

Group II metal ferrites have unique characteristics to partially oxidize methane which is important for producing syngas from fuels. As described in embodiments of the current invention group II metal ferrites may be used for partial oxidation of gaseous fuels such as methane. According to the Ellingham diagrams (see Liang-Shih Fan, Liang Zeng, and Siwei Luo, AIChE Journal 2014, DOI 10.1002/aic incorporated herein by reference) which are based on heats of reactions for oxidation of reduced metal oxides, there are only very limited number of metal oxides participate in the syngas production with methane. The heats of oxidation of the reduced calcium ferrite described in one or more embodiments of this invention are in the syngas production region in the Ellingham diagram at 700-900° C. which indicated that the $CaFe_2O_4$ can be used for selective oxidation of methane to produce synthesis gas.

The performance data on selective production of syngas with methane and metal ferrite oxygen carriers comprising $CaFe_2O_4$ and $BaFe_2O_4$ are illustrated at FIGS. 3-7. $BaFe_2O_4$ and $CaFe_2O_4$ were prepared by mixing metal nitrate precursors. The mixture was heated in an oven to 1000° C. at a ramp rate of 3° C./min in air and kept at 1000° C. for 6 h.

Thermogravimetric analysis (TGA) was conducted in a thermogravimetric analyzer (TA Model 2050) coupled with a Pfeiffer Thermostar D-35614 mass spectrometer (MS) for analyzing the composition of the outlet gas stream from TGA. The samples of Ca ferrite or Ba ferrite were placed in a 5-mm deep and 10-mm diameter crucible. Approximately 60 mg of the oxygen carrier was heated in a quartz bowl from ambient temperature to 800-950° C. in argon (Ar) at a flow rate of 100 sccm. The sample temperature was then maintained isothermally for 30 min. Then 20% methane/Ar was introduced at a flow rate of 100 sccm for 80 minutes. The air was introduced for oxidation. A 5-cycle tests was conducted and compositions from the TGA outlet gas stream were measured using a MS (Pfeiffer Omnistar).

Fixed bed flow reactor studies on methane chemical looping partial oxidation and oxidation with air were conducted in a laboratory-scale fixed-bed reactor (Micromeritics model Autochem 2910 atmospheric flow reactor) at 14.7 psi ($1.01 \times 10^5$ Pa). The metal ferrite oxygen carrier (500 mg) diluted with zirconia (500 mg) was placed in the reactor and heated to 850° C. in a flow of Helium and 20% methane in Helium was introduced for 45 minutes. Then air was introduced at 800° C. for oxidation. The outlet gas stream from the reactor was analyzed using a mass spectrometer (PfeifferVacuum Thermostar). In some experiments a continuous stream of methane/gaseous oxygen/He was introduced simultaneously at 850° C. and product analysis was conducted continuously.

Figure 3:
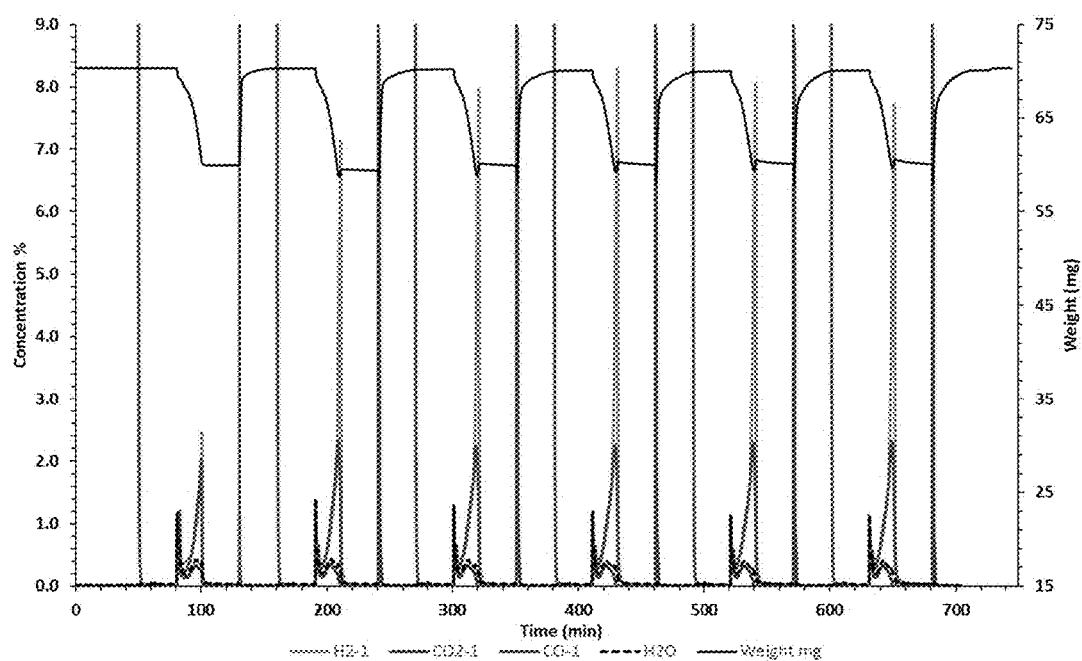
FIG. 3 depicts the 5-cycle TGA test data of $CaFe_2O_4$ with methane/air at 850° C. (reduction—20 minutes with 20 vol. % $CH_4$/80% Argon & oxidation with air)
Figure 4A:
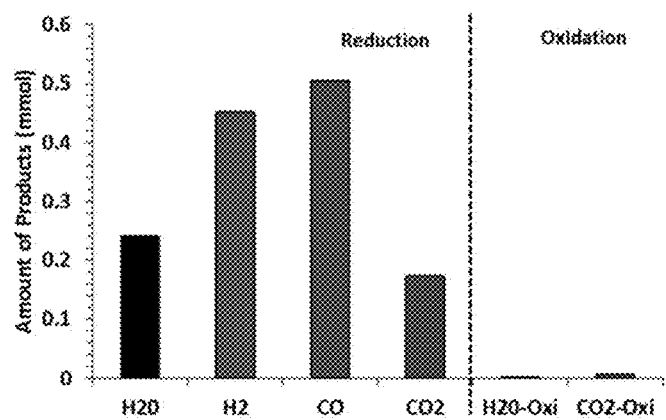
FIGS. 4A & B depicts the moles of gas produced in cycle 1 and the expanded version of cycle 1 in the 5-cycle TGA test of $CaFe_2O_4$ with methane/air at 850° C. (reduction—20 minutes with 20 vol. % $CH_4$/80% Argon & oxidation with air)
Figure 4B:
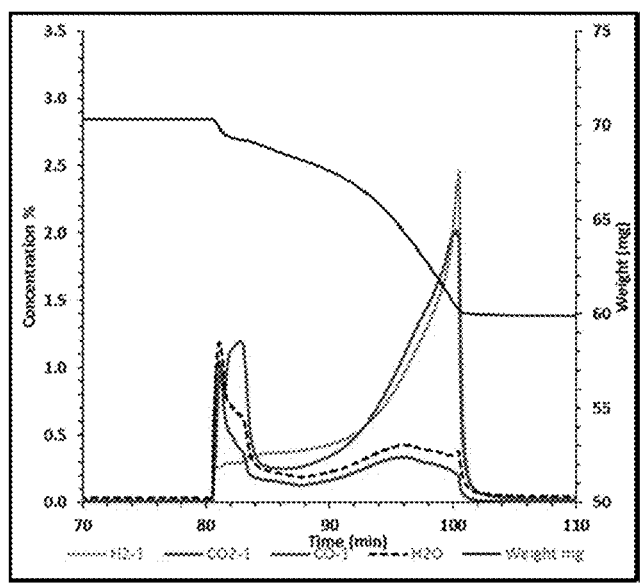

Group II metal Ferrite tests for chemical looping partial oxidation of methane as in Process 1 (FIG. 1) was conducted in a TGA. The TGA weight data and effluent Mass spec. gas concentrations with Ca ferrite at 850° C. are shown in FIG. 3. The weight loss shown in FIG. 3 is due to the reduction of Ca ferrite by methane. During the reduction, there were mass spectral signals corresponding to $H_2$ and CO while the $CO_2$ signal was minimal. After the introduction of methane followed by a nitrogen flush, when air was introduced to the reduced oxygen carrier a weight gain was observed and it reached the original weight prior to the reduction. This indicated that the reduced calcium ferrite was fully oxidized with air. The data were consistent during the 5-cycle test. The TGA weight loss and gas concentrations during the first cycle and the moles of gases produced during both reduction of oxidation of calcium ferrite are shown in FIGS. 4A & 4B. Both concentrations and moles of CO and $H_2$ produced during the methane partial oxidation cycle with calcium ferrite were higher than that with $CO_2$ indicating that the selectivity of syngas production with methane/calcium ferrite was high. Elemental Carbon formation from methane was low during the calcium ferrite reduction cycle as indicated by the low $CO_2$ formation during the oxidation with air after the calcium ferrite reduction cycle.

Figure 5:
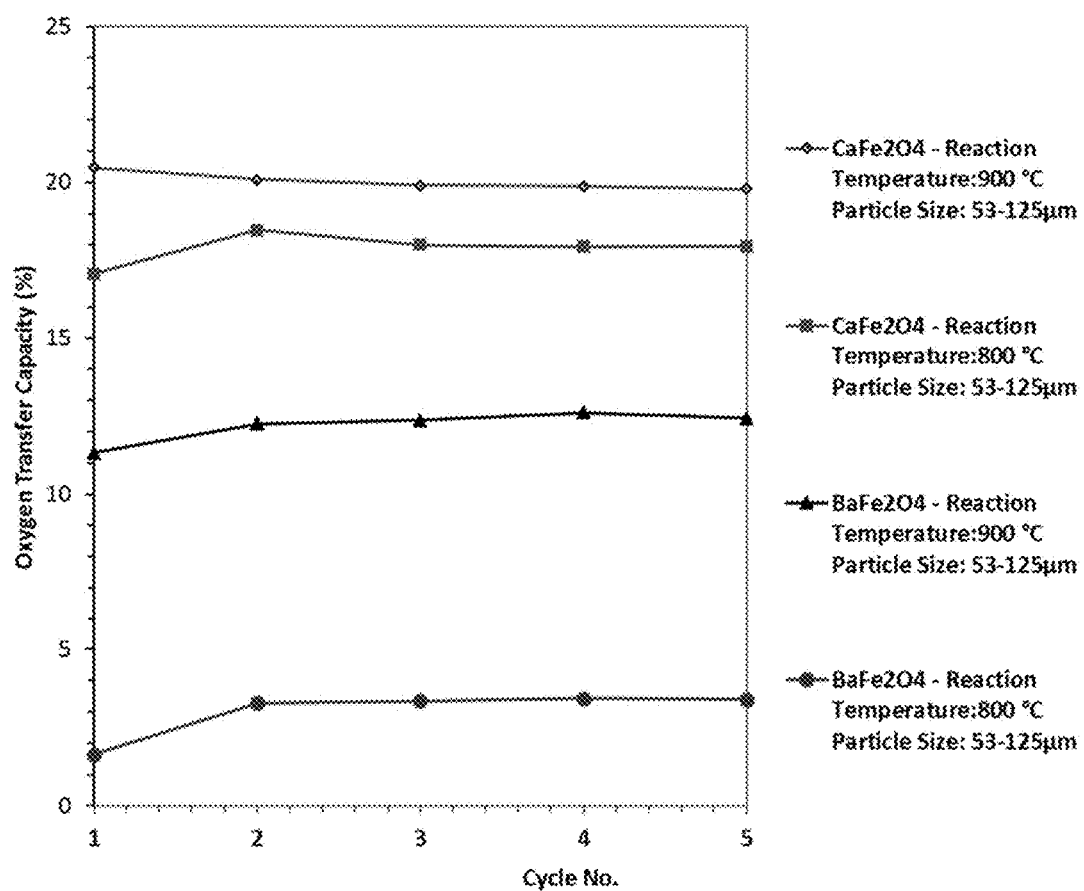
FIG. 5 depicts the plots of comparison of oxygen transfer capacity of CaFe₂O₄ & BaFe₂O₄ during 5-Cycle Methane/air test at 800-900° C.

TGA tests with methane and both calcium ferrite and barium ferrite were conducted at 800° C. and 900° C. Oxygen transfer capacity (amount of oxygen utilized for the partial oxidation of methane reaction based on the weight loss data per 100 g of the sample) of calcium and barium ferrite at 800 and 900° C. during the 5-cycle TGA test with methane/air are shown in FIG. 5. The oxygen transfer capacity of calcium ferrite is higher than that with barium ferrite. The oxygen transfer capacity at 900° C. was higher than that at 800° C. with both oxygen carriers and they were stable during the 5-cycle test at both temperatures.

Figure 6A:
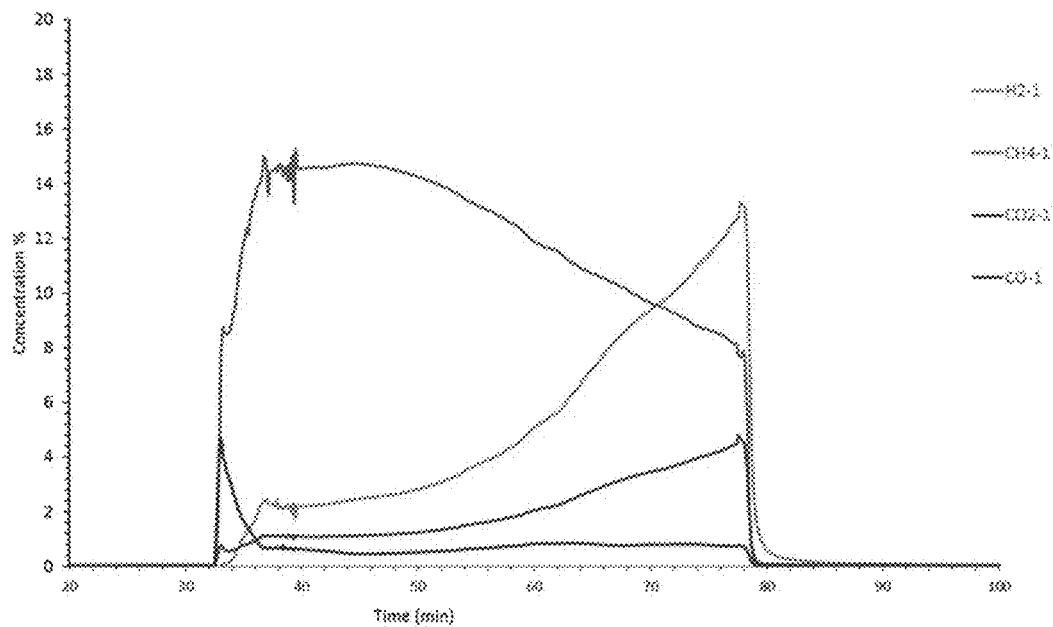
FIGS. 6A & B depicts the fixed bed flow reactor effluent gas concentrations during the first cycle of the CL methane partial oxidation with Calcium ferrite at 800° C. and Product yields.
Figure 6B:
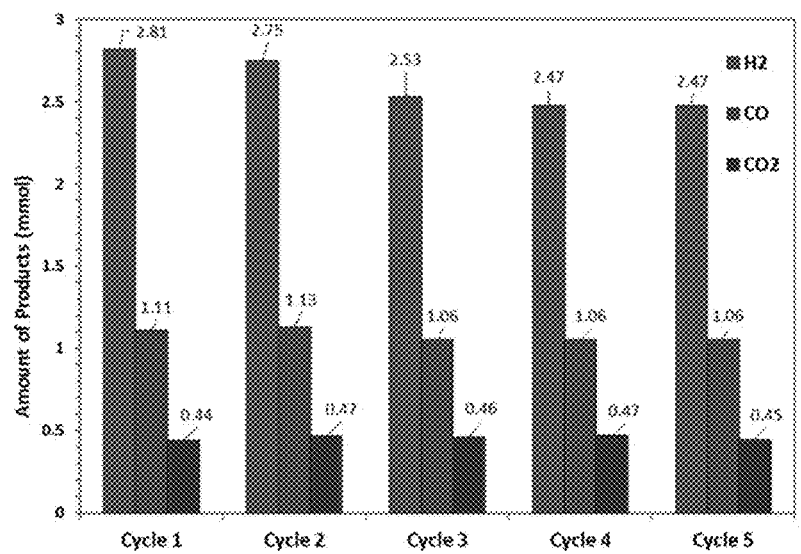

Methane chemical looping 5-cycle test data with calcium ferrite conducted in a fixed bed flow reactor are shown in FIG. 6. Fixed bed flow reactor test data as shown in FIGS. 6A & 6B are consistent with the TGA data. During the reaction of Ca ferrite with methane at 800° C., $H_2$ and CO concentrations increased while $CO_2$ concentration remained low as illustrated in the first cycle data shown in Figured 6A & 6B. Gas yields during the five-cycle test with methane/air indicated that there was a slight decrease in the $H_2$ and CO during the first three cycles and it remained constant after that. $H_2$/CO ratio was close to 2 which is ideal for further processing of the synthesis gas to produce chemicals. The group II ferrites may also be dispersed in an inert support such was alumina, zirconia, silica, titania or mixtures of inerts. Oxygen carrier may also be used in a monolith or micro reactor channels.

Figure 7:
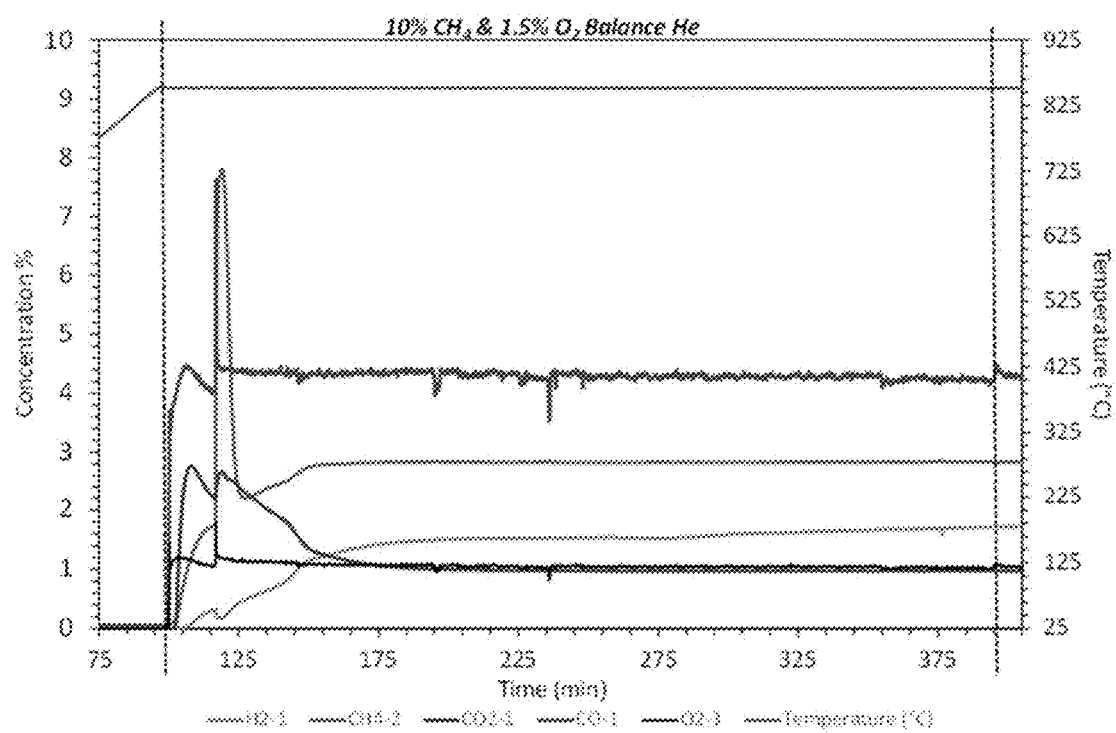
FIG. 7 depicts the fixed bed flow reactor effluent gas concentrations during the catalytic methane partial oxidation test with calcium ferrite and 10% $CH_4$/1.5% $O_2$/He at 850° C.

Fixed bed flow reactor tests were conducted with calcium ferrite to illustrate the process in FIG. 2 in which continuous flow of oxygen and methane were introduced to calcium ferrite at 850° C. Chemical looping oxygen un-coupling materials such as CuO can decompose when heated to produce a stream of oxygen. Equilibrium concentration of 1.5 vol. % $O_2$ can be reached at 900° C. for $CuO/Cu_2O$ system, whereas the equilibrium concentration increases up to 12.4 vol. % at 1000° C. To simulate this process in which gaseous oxygen is introduced to methane via CLOU process, 10% vol.CH4/1.5% $O_2$/He was introduced to 500 mg of Ca ferrite for 5.4 hours. The effluent gas composition during the reaction is shown in FIG. 7. As shown in FIG. 7, the production of CO and $H_2$ concentrations were steady during the 5.4-hour test. A methane conversion of about 74% was observed and carbon formation was not observed. By optimizing the concentrations of methane and oxygen, and the Ca ferrite to gas ratio it will be possible to obtain the desired $H_2$/CO ratio in a steady continuous operation.

These data demonstrated that it is possible to supply an oxygen concentration greater than 1.5% vol. via CLOU process for the chemical looping partial oxidation process with group II ferrites as shown in Process 2 (FIG. 2) to obtain a continuous production of synthesis gas.

Embodiments of the present invention provide one or more of the following:

Use of group II metal ferrites to produce synthesis gas via chemical looping partial oxidation of methane is described. The process involves reacting the group II ferrites with methane to form synthesis gas followed by oxidation of the reduced metal ferrite with air.

Good synthesis gas yields in the $H_2$/CO ratio of 2:1 which is useful for chemical production can be obtained.

High oxygen transfer capacity for the process was observed with group II ferrites which is better than that is reported in the literature.

Stable reactivity was observed during the multiple cycles.

Metal ferrites can also be used as a catalyst for the continuous reaction of methane with gaseous oxygen to obtain a continuous production of synthesis gas A novel process of combining CLOU of CuO to produce gaseous oxygen for the catalytic partial oxidation of methane for continuous production of synthesis gas was demonstrated with methane/calcium ferrite/gaseous oxygen that simulated the concentration of oxygen from CLOU.

Group II metal ferrites are environmentally safe unlike the Ni based materials reported for the process in the past.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for partial oxidation of methane comprising:
   delivering a metal ferrite oxygen carrier to a fuel reactor, wherein the metal ferrite oxygen carrier comprises MFexOy where 1≤x≤3 and 3≤y≤5, and where M comprise Group II alkali earth metals consisting of at least one of Mg, Ca, Ba, Sr and combinations thereof;
   delivering a gaseous stream that contains methane to the metal ferrite oxygen carrier in the fuel reactor and maintaining the fuel reactor at a reducing temperature sufficient to reduce some portion of the metal ferrite oxygen carrier and oxidize some portion of the methane containing gas stream;
   generating gaseous products containing $H_2$ and CO gas in the fuel reactor;
   withdrawing a product stream from the fuel reactor, where the gaseous products comprise the product stream, and where at least >50 vol. % of the product stream includes CO and $H_2$;
   oxidizing the reduced carrier in an oxidizing reactor by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the M component, and some portion of the FecOd component, and further wherein the product of the oxidizing reaction is a re-oxidized carrier that comprises some portion of the MFexOy; and
   delivering heat generated in the oxidizing reactor to the fuel reactor for the reaction of metal ferrite with methane.

2. The method of claim 1 where the reducing temperature ranges from about 700° C. to about 1100° C.

3. The method of claim 1 wherein 1.5≤x≤2.5 and 3.5≤y≤4.

4. The method of claim 1 wherein MFexOy comprises at least 30 wt. % of the metal ferrite oxygen carrier.

5. The method of claim 4 wherein the metal ferrite oxygen carrier further comprises an inert support that comprises from about 5 wt. % to about 60 wt. % of the metal ferrite oxygen carrier.

6. The method of claim 5 wherein the inert support contains at least one of alumina, silica, zirconia, clay, titania, monolith and combinations thereof.

7. The method of claim 1 wherein methane concentration is greater than 5 vol. %.

8. The method of claim 1 further comprising generating a reduced carrier by mixing the methane containing gas stream and the metal ferrite oxygen carrier in the fuel reactor, where the reduced carrier comprises an M component and an FecOd component, where the M component comprises some portion of the M comprising the MFexOy, and MO and where the FecOd component comprises some portion of the Fe comprising the MFexOy, where c>0 and d≥0.

9. The method of claim 8 where the FecOd component comprises $Fe^0$, FeO, $Fe_3O_4$ or $Fe_2O_3$ and the M component is MO, $MCO_3$ or MFex-n Oy-m where n<x and m<y.

10. The method of claim 9 wherein oxidization of the reduced carrier occurs in the oxidizing reactor further comprising:
    transferring the reduced carrier from the fuel reactor to the oxidizing reactor;
    supplying the oxidizing gas to the oxidizing reactor, generating a re-oxidized carrier;
    transferring the re-oxidized carrier from the oxidizing reactor to the fuel reactor;
    repeating the delivery of the metal ferrite oxygen carrier to the fuel reactor, introducing methane to the metal ferrite oxygen carrier in the fuel reactor; and
    withdrawing the product stream from the fuel reactor.

11. The method of claim 10 wherein the oxidizing temperature ranges from about 700° C. to about 1100° C.

12. A method of producing synthesis gas from methane comprising:
    delivering a metal ferrite oxygen carrier to a catalytic reactor, where the metal ferrite oxygen carrier comprises MFexOy where 1≤x≤3 and 3≤y≤5, and where M consists of at least one of Mg, Ca, Ba, Sr and combinations thereof, where the MFexOy comprises at least 30 wt. % of the metal ferrite oxygen carrier;
    delivering a continuous gas stream containing methane of at least >5 vol. %;
    delivering a pure continuous gas stream containing oxygen >1 vol. %;
    maintaining the catalytic reactor at a reaction temperature sufficient to reduce some portion of the metal ferrite oxygen carrier and oxidize some portion of the methane containing gas stream;
    generating a continuous stream of gaseous products containing $H_2$ and CO gas in the catalytic reactor; and
    withdrawing a product stream from the fuel reactor, where the gaseous products comprise the product stream where at least >50 vol. % of the product stream consists of CO and $H_2$.

13. The method of claim 12 wherein the oxygen gas stream is provided by oxygen separated from air.

14. The method of claim 12 further comprising:
    decomposing metal oxide or peroxide generating a gaseous oxygen stream by maintaining a temperature sufficient to generate oxygen from the metal oxide/peroxide by decomposition reaction or Chemical looping un-coupling (CLOU) reaction in a CLOU reactor;
    transferring the reduced metal oxide/peroxide to the oxidizing reactor;
    oxidizing the reduced metal oxide/peroxide by contacting an oxidizing gas comprised of at least oxygen at an oxidizing temperature sufficient to generate an oxidizing reaction, where the reactants of the oxidizing reaction comprise some portion of the oxygen, some portion of the reduced metal oxide/metal peroxide, and where the product of the oxidizing reaction is a re-oxidized metal oxide/peroxide; and
    delivering heat generated from the oxidizing reactor to the CLOU reactor.

15. The method of claim 14 wherein the metal oxide and peroxide contain at least one of copper oxide, manganese oxide, peroxides of alkali, Ba or Sr or combination of thereof.

16. The method of claim 14 wherein the decomposition temperature needed to generate oxygen in the CLOU reactor is above 300° C.

17. The method of claim 14 wherein the oxidation temperature in the oxidizing reactor is above 300° C.

* * * * *